United States Patent [19]
Sun

[11] Patent Number: 5,988,432
[45] Date of Patent: Nov. 23, 1999

[54] BEAD MANIPULATING CHUCKS WITH BEAD SIZE SELECTOR

[75] Inventor: Hoi Cheong Sun, Monmouth Junction, N.J.

[73] Assignee: Sarnoff Corporation, Princeton, N.J.

[21] Appl. No.: 09/047,631

[22] Filed: Mar. 25, 1998

[51] Int. Cl.[6] .................................................. B23Q 7/04
[52] U.S. Cl. ...................................... 221/212; 209/127.1
[58] Field of Search .............................. 221/2, 7, 9, 123, 221/156, 212; 209/127.1, 127.3, 128, 129, 130

[56] References Cited

U.S. PATENT DOCUMENTS

| | | | |
|---|---|---|---|
| 4,113,142 | 9/1978 | Ryzhov et al. ......................... | 221/212 |
| 4,153,151 | 5/1979 | Kulberg et al. ......................... | 198/456 |
| 5,292,029 | 3/1994 | Pearson ..................................... | 221/2 |

*Primary Examiner*—Kenneth W. Noland
*Attorney, Agent, or Firm*—William J. Burke

[57] ABSTRACT

Bead manipulating chucks for selective pick up and discharge of polymer beads for chemical synthesis or analysis, whereby bead collection zones are recessed from bead contact surfaces. The strong dependence of the electrostatic image force on bead overall diameters provides a mechanism that sharply selects bead sizes that are successfully attracted and retained by the bead manipulating chuck. In this way, the bead manipulating chuck acts as an electrical analog to a low pass filter, only attracting and retaining beads of an overall diameter lower than a selected value.

15 Claims, 2 Drawing Sheets

BEAD MANIPULATING CHUCKS WITH BEAD SIZE SELECTOR

The present invention is directed to devices for electrostatically picking up and dispensing beads in a spatially resolved manner. Specifically, this disclosure describes electrostatic bead transporter chucks using specific geometries to serve as bead size discriminators and selectors. Electrostatic bead transporter chucks can be used to pick up, manipulate, transport, and then discharge or place beads or objects for use in creating pharmaceutical or chemical compositions, or in performing assays or chemical analysis.

Bead transporter chucks act as clamps to hold or retain an object or objects. Bead transporter chucks provide superior performance for manipulating synthetic beads having, for example, typical diameters of 100–300 microns, such as are used in chemical processes, such as combinatorial chemistry for solid phase synthesis, or in an assay using PCR (polymerase chain reaction) or other processes. In combinatorial chemistry, a multi-well array such as a microtiter plate allows screening or synthesis of many compounds simultaneously.

For example, bead transporter chucks allow deposition of beads on an array in a manner that is faster and more reliable than by the use of micropipettes, which can be inefficient, tedious, and time consuming. Another application for bead transporter chucks is synthesis of pharmaceutical compositions, especially when used to combine compounds to form compositions to be packaged into administration forms for humans or animals.

Beads containing one or more active ingredients can be deposited onto carriers or substrates to make pharmaceutical dosage forms. Such beads can take the form, for example, of [1] a powder, such as dry micronized forms made by air jet milling processes, where overall particle dimensions can be, for example, in the 1 to 10 micron range usefil for dry powder respiratory administration of medicaments, with 4–8 microns preferred, [2] microspheres; [3] extremely small structures, including fullerenes, chelates, or nanotubes; or [4] liposomes and fatty droplets formed from lipids or cell membranes.

The use of bead transporter chucks provides a customized and precise method for formulating drug compositions. The transporter can be used when merging adjacent substrates carrying active ingredient to form multidosage packs, in which dosage can decrease or increase from one individual unit to the next, as in hormone-based (e.g., birth control) drugs or antibiotic remedies. Using an electrostatic bead transporter chuck, dosages can be easily established or determined by the number and/or type of beads dispensed onto each pharmaceutical carrier. Using bead transporter chucks to place active ingredients into pharmaceutical compositions can give high repeatability and is also advantageous when the active ingredients are not compatible, such as when the active ingredient is poorly soluble with the carrier, or where a formulation or carrier negatively affects the bioavailability of the active ingredient.

Although emphasis is placed in this disclosure on electrostatic bead transporter chucks using electric fields for bead retention and/or release, the teachings given here can be applied to chucks using other phenomena, such as the use of compressed gas or vacuum or electrically/chemically switchable adhesives, in controlling beads. Electrostatic holding mechanisms, however, are far more benign to delicate bead structures than traditional mechanical techniques, particularly when manipulating biologically active compounds where crushing, contamination, or oxidative damage should minimized or eliminated.

The present invention can also be used in conjunction with acoustic bead dispensers, where acoustic energy, provided by a speaker or piezoelectric device, is used to great advantage in bead control, that is, propelling and/or tribocharging beads prior to, and especially during, electrostatic manipulation. Tribocharging the beads, as known in the art, and described below, is efficient and less damaging to the beads than corona or plasma charging, which typically requires high applied voltages of around 5 kV. Often, the sonically vibrating membrane used in such an acoustic bead dispenser can itself be used to tribocharge the particles, eliminating the need to charge the beads prior to their entry into the acoustic dispenser. The use of acoustic dispensers allows polarity discrimination of beads, where wrongly charged beads are discouraged from being retained by the bead transporter chuck.

In the course of using bead transporter chucks for creating pharmaceutical or chemical compositions, or in performing assays or chemical analysis, certain problems arise and certain requirements have been identified.

Bead transporter chucks can offer precision in being able to have one, and only one bead attracted, transported, and discharged for each bead transporter chuck, or for each well, pixel, or individual spatial element of the bead transporter chuck. In many cases, each pixel can be considered a tiny bead transporter chuck that is selectively and independently controlled, such as planar chucks having individually addressable x and y coordinates. This includes individually addressable pixels for different (multiple) bead types.

Beads manipulated by suitable bead transporter chucks are easily and controllably releasable, with wrongly charged beads (objects or beads having a charge of the opposite polarity desired) not occupying bead retaining or collection zones on the bead transporter chuck. Such bead transporter chucks function well for a wide range of bead diameters, including beads with general dimensions of 100 microns and up, and also including porous or hollow beads that have high charge/mass ratios. These bead transporter chucks also offer durability and re-usability, and good ease-of-use, including having selectively or wholly transparent elements for easy movement and alignment of the chuck with intended targets or carriers.

However, when using bead transporter chucks for chemical analysis or synthesis, it is desirable to select a narrow range of eligibility for overall bead diameters or sizes to be attracted, retained, and selectively discharged by the bead transporter chuck.

In preparing pharmaceutical compositions, for example, it is important to meet established standards. Section 501(b) of the United States Food, Drug, and Cosmetic Act (Title 21) deems an official drug to be adulterated if it fails to conform to compendial standards of quality, strength or purity. Standards and test methods have been established for such characteristics as potency, sterility, dissolution, weight variation and content uniformity. Favorable experience with these factors should be demonstrated for drug approval, and weight variation and content uniformity can be affected by the distribution of overall bead diameters used in synthesis, especially since the amount of active ingredient in beads is usually proportional to their surface areas or volumes, which are more drastically affected by variations in bead sizing.

Methods for use of bead transporter chucks and acoustic bead dispensers are set forth in Sun, "Chucks and Methods for Positioning Multiple Objects on a Substrate," U.S. application Ser. No. 08/630,012, filed Apr. 09, 1996 now U.S. Pat. No. 5,788,814; Sun et al., "Electrostatic Chucks," U.S. application Ser. No. 08/661,210 filed Jun. 10, 1996 now U.S. Pat. No. 5,858,099; Pletcher et al., "Method and Apparatus for Electrostatically Depositing a Medicament Powder Upon Predefined Regions of a Substrate," U.S. application Ser. No. 08/659,501, filed Jun. 06, 1996; and Sun et al., "Acoustic Dispenser," U.S. application Ser. No. 08/661,211 file Jun. 10, 1996 now U.S. Pat. No. 5,753,302.

Bead transporter chuck designs that use flat or undifferentiated bead contact surfaces and bead collection zones to pick up and discharge beads generally do not discriminate, or can only weakly discriminate, among bead sizes or diameters that have access to the bead contact surfaces. With little or no explicit or physical discrimination in bead size, a broad range of bead diameters can be attracted to and picked up by the bead transporter chuck. While bead size can, in principle, be controlled at other stages of a process, the present bead transporter can advantageously provide for size selectivity. Thus, for example, the bead transporter can provide for secondary quality control for bead size.

Because of this wide distribution of overall bead diameters retained during operation of the chuck, the density of pixels or individual bead collection zones per unit area of the bead contact surface achieved in a chuck design can be low. If, for example, a bead transporter chuck design or configuration has pixels or individual bead collection zones placed too close together, then during operation of the chuck, some bead collection zones can remain vacant, as these zones are partially blocked by large beads retained in neighboring zones. Since a bead per bead collection zone is the goal, this is unacceptable.

When using the bead transporter chuck to perform synthesis, a wide distribution in bead diameters—size distributions with ±30% standard deviations are not uncommon—makes close packing, such as hexagonal close packing, difficult to achieve. Hexagonal close packing can be important in the manufacture of pharmaceutical compositions, where high bead density per unit area can be desirable, as discussed below.

Alternatively, when using the bead transporter chuck to perform assays, chemical analyses or other chemical processes, the distribution of overall bead diameters manipulated by the chuck can lead to even wider surface area and volume distributions that can render the assays or analysis qualitative, not quantitative. Even a 10% uncertainty in overall bead diameter can translate approximately to a 21% uncertainty in bead surface area, and a 33% uncertainty in bead volume or mass.

Currently, separation by bead sizes is done by mechanical sieving, such as by using gravity fed physical sieves or meshes. A typical size distribution or range obtained using sieving is 20% of the average bead diameter ($D_{average}$). One problem is that beads sorted in this way undergo physical rubbing and scraping, which can damage the beads. Another problem is that during sieving, beads get trapped in the sieve, mesh, or screen used. This clogging can be a serious problem, as beads trapped can be difficult to retrieve, or can emerge after bead damage or loss of active ingredient has occurred.

It is therefore desirable to separate beads according to their overall diameter or size, using electrostatic techniques during the course of electrostatic bead transporter chuck operation. The higher the desired densities of bead collection zones per unit area on the bead contact surface, the more important bead size selection and discrimination becomes for achieving close packing. For certain chemical processes using the chucks, bead size selection is essential for quantitative results.

SUMMARY OF THE INVENTION

The problems of bead sizing are addressed in this invention by introducing bead manipulating chuck geometries that offer narrow specificity in overall bead sizes or diameters. Rather than use casually chosen geometries for the bead contact surface and bead collection zones, Applicant has discovered that sensitive physical mechanisms can be exploited that give a narrow bead diameter specificity.

Bead manipulating chucks using geometries described herein can be used, in effect, as the electrical analogue to low pass filters to discriminate among bead sizes—that is, they can be used to attract, retain, and later discharge—in effect, select—only beads below a certain overall diameter. Samples can be generated possessing a narrow bead size range using successive iterations if necessary, creating bead classes that have tight size ranges or tolerances, making them acceptable candidates for creating or forming the active ingredients in administration forms.

In one embodiment, a bead manipulating chuck for attracting beads to a bead collection zone on a bead contact surface, and for retaining and discharging beads from the bead collection zone, is disclosed whereby one or more bead electrodes are provided for selectively establishing a bead attracting field to a bead collection zone. The bead collection zone is recessed from the remainder of the bead contact surface, and configured and positioned with respect to the bead contact surface such that the resultant electrostatic image force generated between the bead and the surface of the bead electrode for a given bead charge is lower than that for beads of higher than a selected overall diameter.

In another embodiment, the bead contact surface comprises a shield material on the bead contact surface, where the shield material is shaped and configured to allow beads to be influenced by the bead electrode and to allow the bead collection zone to be or remain recessed. Optionally, a dielectric can be positioned between the bead electrode and the bead contact surface.

The bead manipulating chuck can have its bead electrode positioned for exposure to the bead contact surface, with or without the dielectric. The bead electrode can also comprise a bus electrode to serve as a connecting bus for the bead electrode. This allows two or more bead electrodes to be connected to the bus electrode and the bus electrode to be configured to allow x-y addressing of the bead electrodes to control individually and selectively two or more bead collection zones.

Also disclosed are methods for using the bead manipulating chuck to attract, transport and dispense beads, and to perform bead size sorting.

DEFINITIONS

Figure 1:
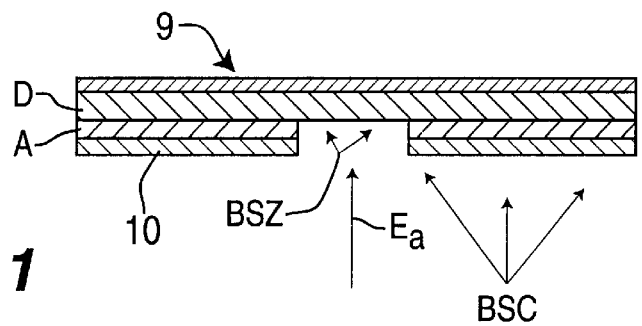
FIG. 1 shows a cross-sectional view of a portion of one bead manipulating chuck according to the present invention, and illustrates structures that form one pixel or bead collection zone.

The following definitions shall be employed throughout:

"Bead" or "beads" refers to any material thing such as a particle, object, tablet or receptacle, capable of being manipulated. This includes spheres or beads made from polymer and reactive polymer masses, such as styrene-based polymers used in the Merrifield type of solid-phase synthesis.

"Bead electrode" connotes any electrode meant to attract and retain materials things such as beads. Upon reducing or reversing of the electrical potential applied to it, a bead electrode can selectively allow discharge or release of a bead or beads retained.

"Bead contact surface" includes all surfaces of the bead manipulating chuck that are accessible to bombardment, contact or exposure to beads, regardless of whether such access is physically encouraged or discouraged. However, when discussing specifically the bead collection zone (see definition below), the bead collection zone can then be described separately from the remainder of the bead contact surface.

"Bead collection zones" includes surfaces of the bead contact surface at which bead attracting fields generated by bead electrodes attract and favor retention of a bead. In preferred embodiments of the invention, the bead collection zones are found at holes, apertures, or recessed areas of the bead contact surface, and these recessed areas are sized to favor retaining of beads of a selected size range or shape.

"Conductor" and "electrode" shall include surfaces or sets of surfaces, continuous or non-continuous, that are capable of carrying electric current.

"Dielectric" refers to any dielectric material, such as electric insulators in which an electric field can be sustained with a minimum power input; the term is applied generally such that solid metals, if manipulated to meet this definition, for example with a radio frequency applied voltage, can be considered dielectrics. This dielectric material need not be solid (e.g., it can be hollow) and it can be made up of substructures or different constituent dielectric subparts or material types.

In the present context, "hexagonal close packing" refers to 2-dimensional packing structures where the location of bead collection zones in adjacent rows are offset to allow better use of the real estate on a bead contact surface than would occur if the bead collection zones were in register. The phrase does not imply that the bead collection zones or beads at these zones are in contact with one another. In some embodiments, it is preferred to keep an amount of shield material separating the bead collection zones.

An "image force" is an attractive, electrostatic force resulting from a charged object such as a bead coming into the vicinity of a conductor, that undergoes a charge redistribution as a result of the proximate charged object to create the attractive force.

"Reducing," such as in the context of reducing applied potentials to bead electrodes to allow bead discharge, shall include reduction and reversal of polarity of the applied potential, such as going from +500 V to −500 V or vice versa "Retention sufficient" force, such as image force, is a force sufficient to retain a bead at a bead collection zone under the operating conditions of a bead manipulating chuck. Such operating conditions can include vibrating or otherwise moving the bead manipulating chuck where appropriate for, or a consequence of, the process for which the chuck is used, or where vibration is applied to assure that weakly attracted beads are not be retained.

"Shield material" refers to electrodes or other material that are used at the bead contact surface to shield (at least partially) a charged bead from being influenced by attraction fields emanating from a bead collection zone, and/or to define and shape (narrow) the local electric attraction field to encourage bead retention only in intended bead collection zones.

Regarding electrode orientations, and surrounding dielectrics, the invention is sometimes defined using the terms "around," "between," and "surrounding," such as where shield electrode 10 is formed around, or surrounds, a bead collection zone. When electrodes, conductors, or dielectrics are found on different levels or layers of the bead manipulating chuck, "around" and "surround" are to be interpreted in view of the areas of the bead contact surface to which the electrode or structure in question will map to by projecting each point to the nearest point on the bead contact surface.

It is also important to note that although the term electrostatic is used throughout this disclosure, no limitation is meant or intended in terms of time variations of charge on electrodes and conductors used in the present invention. Electrical currents can and will flow in the course of using the bead manipulating chucks as described, in order to apply and remove electric charge as required. Potentials refer to electric potentials or applied voltages.

DETAILED DESCRIPTION OF THE INVENTION

Referring to FIG. 1, a cross-sectional view of a portion of one bead manipulating chuck according to the present invention is shown. The figure shows the structures for a single bead collection zone. The lower portion of this figure shows shield material 10 which is applied to one face of dielectric layer D in a parallel plane using any number of techniques known in the att, such as laminating, powder deposition, vapor deposition or thin film deposition, such as magnetron sputtering or electron bean evaporation. Shield material 10 can be an electrode (i.e., conductor) or a dielectric, as discussed below. In certain embodiments, the shield material is preferably an electrode.

As shown in the figure by way of example only, shield material 10 is affixed to dielectric layer D using an adhesive layer A, using any adhesive capable of forming a mechanical bond. Dielectrics can include, for example, commonly available materials such as Corning Pyrex 7740 glass (high melting point borosilicate glass, Corning Inc., Corning, N.Y.), for instance with a thickness of about 10 to about 50 microns. The shield material 10 is formed having apertures (as shown, by way of example). One such aperture allows for establishing a bead collection zone BCZ, at the face of dielectric layer D. Generally shield material 10, and exposed portions of dielectric layer D form a bead contact surface BCS that is accessible to bombardment, contact or exposure to beads, such as from a bead dispenser or container, not shown. The bead collection zone BCZ established is recessed from the remainder of bead contact surface BCS. In order to use applied voltages to establish an attraction field $E_a$, which is illustrated pointing toward the bead collection zone BCZ, a bead electrode 9 is provided at the other face of dielectric layer D.

Although the bead collection zone BCZ is shown as being flat, it can also be beveled, bowl-shaped, or have any other profile that can facilitate bead attraction, retention, and discharge.

Electric fields in this and later figures are shown using the standard convention, indicating roughly the direction of the force on a positive test charge. For actual examples of applied voltages and bead manipulating chuck operation in this disclosure, a working convention is adopted that negatively charged beads are to be attracted and later discharged. When manipulating positively charged beads, however, one can simply reverse the applied voltages from those given in the discussion below.

As shown, bead electrode 9 is not exposed to the bead contact surface BCS or the bead collection zone BCZ. The electric field, however, generated by a potential applied to bead electrode 9 can emanate through dielectric layer D, with the net electric field generated diminished by electric polarization in dielectric layer D, depending on its dielectric constant ε, which can be anisotropic. See *Classical Electrodynamics 2nd Ed*, John David Jackson, ©1975, John Wiley & Sons, New York.

A voltage can be applied to bead electrode 9 relative to shield material 10 or relative to another surface in the bead dispenser or container to allow attraction of beads to the bead collection zone BCZ. Bead electrode 9 can serve to provide an attraction field for a plurality of bead collection zones, but only one bead collection zone is shown for illustration.

To aid in visual confirmation of bead capture at the bead collection zone BCZ, a hole (not shown) can be provided through bead electrode 9 and dielectric layer D. For a transparent or translucent dielectric layer D, such a hole provides a visual or optical monitor sight to verify if a bead is being retained. This allows for automated verification of bead occupancy in the bead collection zone, using known sensors to determine the hole opacity in terms of percent light transmission. For example, the light transmitted through such a hole can be optically mapped onto an array detector such as a charge-coupled device (CCD), an intensified CCD array, a focal plane array, or photodiode array. The array detector can be, for example, a CCD (such as that available from DALSA, Inc. (Easton Conn.), Sarnoff Corporation (Princeton N.J.) or Princeton Instruments (Trenton N.J.); an intensified CCD array (such as that available from Princeton Instruments, Hamamatsu Corp. (Bridgewater, N.J.) or Photometrics Ltd. of Tucson, Ariz.); a focal plane array (such as that available from Scientific Imaging Technologies, Inc. (Beaverton, Oreg.), Eastman Kodak Co., Inc. (Rochester N.Y.) or Sarnoff Corp.); a photodiode array (such as that available from Reticon Corp. (Sunnyvale Calif.), Sensors Unlimited, Inc. (Princeton N.J.) or Hamamatsu); or a photodetector array (such as that available from FLIR Systems Inc. (Portland Oreg.), Loral Corp. (New York N.Y.) or Hughes Electronic Corp. (Los Angeles Calif.)).

When grounded or biased to a polarity similar to the beads to be manipulated, shield material 10 can discourage beads from being attracted or retained at any locations on the bead contact surface BCS other than the intended bead collection zone BCZ. However, shield material 10 can comprise any nonconductive material such as an insulator or dielectric.

In lieu of dielectric layer D, air or the ambient gas or vacuum can be used as a dielectric or insulator. In this case, insulated mechanical standoffs or other fasteners can be used to hold bead electrode 9 in the same plane as, but offset from, shield material 10. This would expose one or both of bead electrode 9 and shield material 10 directly to the bead contact surface.

Fabrication techniques for forming conductive layers and electrodes in this disclosure can vary considerably, as any known technique satisfying modest electrical and mechanical requirements can be used. Nearly any metal can be used, for example, to form bead electrode 9 and shield material 10, which can comprise thermally or electromagnetically deposited metals such as indium tin oxide, brass, platinum, copper, or gold, of any usefull thickness, but preferably of about 1000 Angstroms to about 10 microns (100,000 Angstroms) in thickness. The same is true for dielectric layer D or laminates—the materials used can be of any type compatible with surrounding electrodes, and can have sufficient dielectric strength to withstand anticipated voltages applied. Such dielectrics include, for example, ceramic materials; silicon dioxide; alumina; polyimide resins and sheets or other suitable polymers; metallic oxides, such as aluminum oxide and titanium oxide; and titanates of calcium and magnesium. Dielectric layer 13 can range in thickness, for example, from about 10 Angstroms to about 1000 microns. Many of these fabrication methods do not require use of adhesive layer A.

Figure 2:
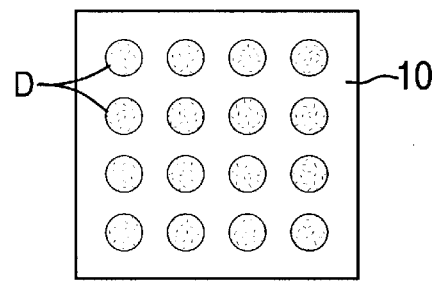
FIG. 2 shows a surface bottom view of the bead manipulating chuck given in FIG. 1, with the shield material configured for sixteen pixels or bead collection zones.

Now referring also to FIG. 2, a surface bottom view of the bead manipulating chuck of FIG. 1 is shown, with the shield material 10 now shown configured for sixteen pixels or bead collection zones, by way of sixteen apertures in shield material 10. Each bead collection zone thus produced exposes dielectric layer D to the bead contact surface, as shown.

Spacing of the bead collection zones can vary, depending on the number and size of beads to be manipulated. For example, the entire surface of shield material 10 as shown, with all sixteen pixels or bead collection zones, can be a square of sides 49 mm in length; or it can be much smaller, say, 5 mm square, or 1.0 mm square, for manipulating small beads for placement on a smaller substrate, such as a pill or capsule. Hexagonal close packing is preferred, as discussed below.

The recesses in the bead contact surface are illustrated as circular in shape, as in a preferred aspect of the present invention. Other shapes, however, are useful, as indicated by empirical and geometric considerations, in a particular process. Oblong shaped recesses, for example, can be useful for oblong-shaped beads.

Figure 3:
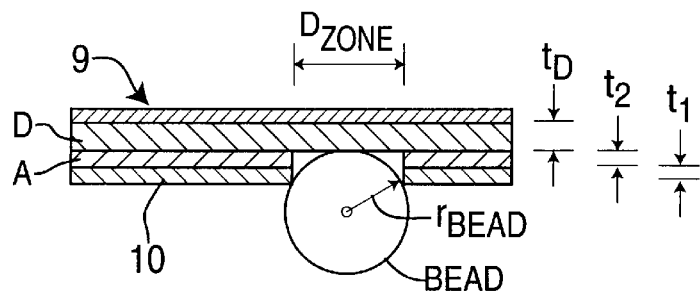
FIG. 3 shows the cross-sectional view given in FIG. 1, with a retained bead shown that is at the higher end of the bead size spectrum for which the electrostatic image force does not drop significantly.

Now referring also to FIG. 3, a cross-sectional view like that shown in FIG. 1 is given, with a bead (Bead) retained in the bead collection zone BCZ. For illustration purposes, the bead shown is of a particular size suitable for the bead manipulating chuck graphically shown. Specifically, the bead shown has a diameter at the upper end of the range of diameters that will allow the bead to touch the edge of the exposed portion of shield material 10 and dielectric layer D simultaneously. Due to geometric considerations, this corresponds to the maximum bead size for which the electrostatic image force does not drop significantly for a given bead charge q, as will be discussed. As discussed more fully above, the image force is an attractive electrostatic force tending to attract a charged bead due to charge redistributions in nearby conductors. In this case, the image force is typically that due to the charge of the bead and a charge redistribution or polarization in the bead electrode.

The particular geometry shown by way of example allows for bead size discrimination, and we can approximate the discrimination characteristics by isolating geometries that contribute to a bead size selection process. Bead collection zone BCZ is shown having an overall diameter $D_{zone}$, while dielectric layer D is shown having a thickness $t_D$. The bead collection zone BCZ is recessed from the remainder of bead contact surface BCS, and to characterize this, note that as shown, $t_1$ is the thickness of shield material 10, while $t_2$ is the thickness of the adhesive layer A.

These thicknesses, $t_1$ and $t_2$, add together to give an overall recession distance, $T_{recession}$, of the bead collection zone BCZ relative to the bead contact surface BCS:

$$T_{recession} = t_1 + t_2 \qquad (1)$$

If bead collection zone BCZ is beveled, bowl-shaped, or has any non-flat profile to further favor retention of beads of a particular size, $T_{recession}$ can more generally be measured in other ways, such as by measuring the distance between the center of the bead collection zone BCZ and the plane of the exposed portion of the shield material 10 at the bead contact surface BCS. Since adhesive layer A is optional, $T_{recession}$ can consist simply of the thickness of shield material 10 alone, or of the thickness of the shield material and another intermediate layer.

Figure 4:
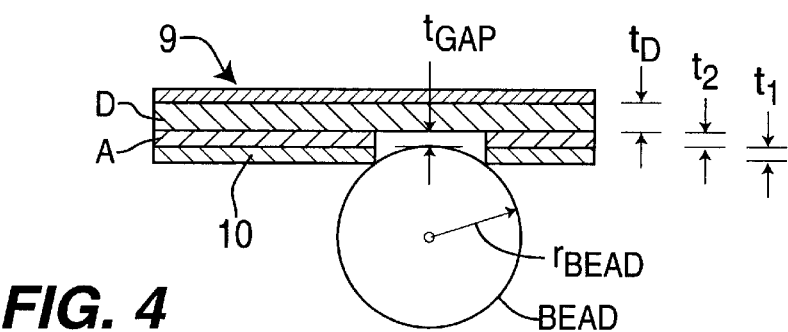
FIG. 4 gives a cross-sectional view similar to that of FIG. 3, but where the retained bead is larger than that of FIG. 3.

Now referring also to FIG. 4, a cross-sectional view similar to that of FIG. 3 is shown, but where the bead shown retained at the bead collection zone is larger than that of FIG. 3. Note t the larger bead shown here has a thin air gap of width $t_{gap}$, as shown, between the bead top surface and dielectric layer D. This air gap can be a gap in air, or a gap in the ambient gas or vacuum environment in which the bead manipulating chuck operates. In the figure, the dielectric layer D is shown having a large thickness for illustration purposes; in practice, it can be quite thin, for example, about 10 to about 20 microns. This thinness accentuates the importance of the air gap, as will be seen below.

It is important to note that particle charging—whether by triboelectric and contact transfer, corona charging, thermionic and field emission charging or other method typically occurs essentially at the particle surfaces. These surface effects are well known, and are aided by electric polarization, that is, induced surface charge in response to an applied electric field. Polarization is ubiquitous in nature. A charged rod, for example, will attract uncharged bits of paper due to polarization (charge redistribution) in the paper. In attracting and manipulating beads, image charges, and electric polarization play a role. To attract and retain beads, the total electrical force $F_{elec}$ generated in the electric field E inside a bead source such as a dispenser or container should be equal to, or greater than, the force $F_{grav}$ of gravity:

$$F_{elec} = Eq \geq F_{grav} = mg \qquad (2)$$

Using this invention, a cutoff in electrostatic image force, $F_{image}$, begins for increasing bead size, roughly after a maximum bead size is reached as indicated in FIG. 3, where the bead size is such that the bead can just touch both dielectric layer D and shield material 10 at the same time. For larger bead sizes than this, a gap ($t_{gap}$) occurs. Bead collection zone BCZ has a radius $$R_{zone} = D_{zone}/2 \qquad (3)$$

while the charged bead to be attracted, retained, and later discharged has a radius $$r_{bead} = d_{bead}/2 \qquad (4)$$

The maximum bead size for which $t_{gap}$ is zero can by geometric considerations and Pythagoras' Theorem be evaluated simply:

$$(r_{bead})^{\wedge 2} = (R_{zone})^{\wedge 2} + (r_{bead} - T_{recession})^{\wedge 2} \qquad (5)$$

which yields $$r_{bead} = (T_{recession}^{\wedge 2} + R^{\wedge 2})/(2T_{recession}) \text{ and} \qquad (6)$$

$$R_{zone} = [2r_{bead}T_{recession} - T_{recession}^{\wedge 2}]^{\wedge \frac{1}{2}} \qquad (7)$$

Although a particular bead size cannot touch dielectric layer D, the bead will still be held by the electrostatic image force and be retained or lowered to some extent This can be experimentally determined, and a simple model will illustrate here. Using similar geometric considerations, $t_{gap}$ can be calculated by:

$$t_{gap} = T_{recession} + [r_{bead}^{\wedge 2} - R_{zone}^{\wedge 2}]^{\wedge \frac{1}{2}} - r_{bead} \qquad (8)$$

Further increases in bead size beyond the critical or maximum bead size result in a gap ($t_{gap}$) and a sharp reduction in resultant holding forces for the charged bead. In the vicinity of the bead collection zone BCZ, surface charge shifting (polarization) on the bead plays a large role. As the bead approaches the bead collection zone BCZ, and bead electrode 9, an image charge of increasing magnitude will accumulate on the lower surface of electrode 9. In the vicinity of bead collection zone BCZ, the electrostatic image force, $F_{image}$, due to this image charge is in practice more significant than the force $F_{elec}$ given above. As a gap of thickness $t_{gap}$ widens, the overall distance between the surface charge on the charged bead and the corresponding image charge on the lower surface of bead electrode 9 increases. This lowers the electrostatic image force, as electric fields by their nature attenuate in an inverse square relationship. We can use the following rough model to illustrate the dependence of the electrostatic image force on the bead size, for a given charge q on a bead. We can roughly approximate the critical dependence of the electrostatic image force $F_{image}$ on $t_{gap}$ and other factors using the electrostatic image force equation, which written for the bead as follows:

$$F_{image} = \frac{q^2}{4\pi\varepsilon_0\varepsilon[t_D + t_{gap}]^2(\pi d_{bead}^3/6)\rho g}. \qquad (9)$$

in the denominate to $\epsilon_0$ so is the vacuum permittivity; $\epsilon$ is the overall dielectric constant of dielectric layer D; ($\pi d^{\wedge 3}/6$) is the bead volume; $\rho$ is the bead mass density in kg/m$^3$; and g is the acceleration due to gravity. This gives the electrostatic image force on a bead occupying the bead collection zone in units of g. This rough model assumes that the air gap of width $t_{gap}$ and adhesive layer A have the same dielectric constant as the dielectric layer D. This is generally an acceptable assumption, since the dielectric constant $\epsilon$ is not responsible for the critical dependence of the image charge-induced holding force on bead size.

Without being bound by a particular theory, in certain embodiments it is believed that the weaker image force applicable to over-sized beads will be sufficient to provide a statistical period of release of these beads from bead collection zones, so that beads that of the desired size have an opportunity to fill these bead collection zones (and be retained more strongly). This steady-states release of over-sized beads allows for size selectivity to proceed in essentially one step. This selectivity can be exemplified if one makes the simplifying assumption that the process is stepwise. Thus, viewed as a stepwise process, if 40% of bead collection zones are initially filled with larger beads, and then the over-sized beads are released, when these 40% are re-filled with, for example, the same ratio, only 16% will be filled with over-sized beads. Three iterations leaves only 6.4% filled with over-sized beads, and five iterations results in only 1% filled with over-sized beads.

Alternatively, because the image force can predominate over the attractive force due to a potential applied the bead electrode, physical motion such as vibration can be used to displace weakly retained beads, thereby providing openings for smaller sized beads to fill a given bead collection zone. Once an appropriately size bead fills a bead collection zone, the stronger image force retaining the bead reduces that beads tendency to vacate the bead collection zone.

In certain aspects of the invention, it may be desirable to adjust the potential applied to the bead electrode to further favor release of over-sized bead. Thus, in one aspect of the invention, the potential applied to the bead electrode can be reduced or terminated after beads are initially attracted to the bead collection zones. For example, the bead electrode can be grounded. The force tending to retain the beads will be lowered for all beads that are of greater diameter than that intended to be attracted to the bead manipulating chuck, since the retentive image force will be sharply smaller for these larger beads. Accordingly, an iterative cycling of potential applied to the bead electrode can (a) attract beads, (b) release over-sized beads, (c) again attract beads to bead collection zones vacated in step (b), (d) over-sized beads are again released, and so forth.

As discussed more fully below, the bead manipulating chucks of the invention can be used in sizing procedures. For instance, a first bead manipulating chuck can be used to remove from a collection of beads individual beads that are smaller than desired, yielding a second collection of beads. Then another bead manipulating chuck can be used to collect a narrowly sized collection of beads, with over-sized beads are left in the second collection.

Figure 5:
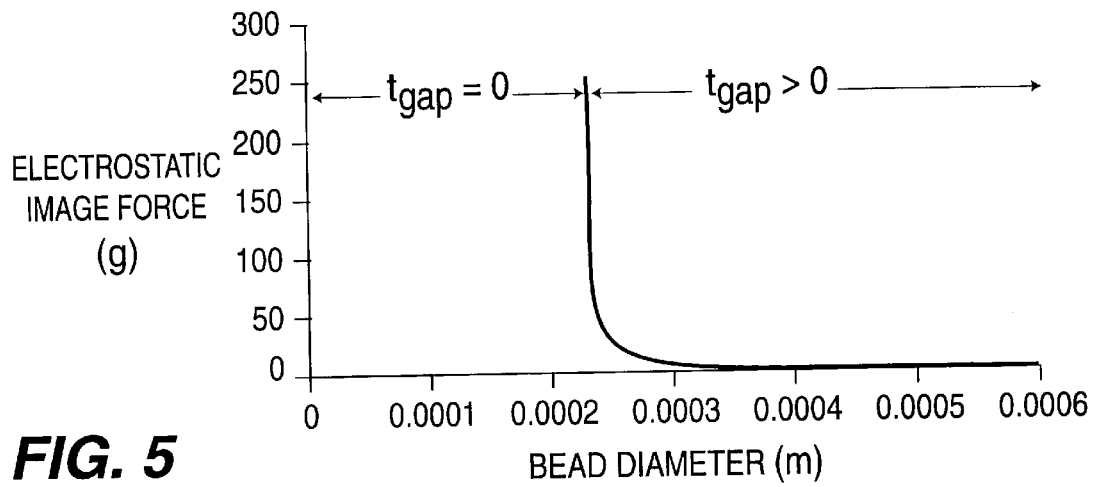
FIG. 5 shows a Cartesian graphical relationship between individual bead diameter and the resultant electrostatic image force produced by a bead manipulating chuck according to the present invention.

An example of the resulting bead diameter specificity is shown in FIG. 5, which shows a Cartesian graphical relationship between individual bead overall diameter, in meters, and the resultant electrostatic image force produced by a bead manipulating chuck according to the present invention, in units of g, the acceleration due to gravity. For this plot, the diameter of the bead collection zone, $D_{zone}$ is 225 microns; the charge on the bead is $10^{\Lambda-12}$ Coulomb; the thickness $t_D$ of the dielectric layer D is 13 microns, with the dielectric layer having a simple isotropic dielectric constant $\epsilon$ of 3.5; the thickness $t_1$ of the shield material 10 is 70 microns; and the thickness $t_D$ of the adhesive layer A is 25.4 microns, giving a total recession of the bead collection zone, $T_{recession}$, of 95.4 microns. The assumed density of the beads is 1000 kg/m³. Making certain idealized assumptions with these values, the maximum bead size for which $t_{gap}$ is zero, and for which the electrostatic image force is undiminished, is 228.07 microns. This target maximum bead size can be termed $r_{bt}$ (bead target).

As can be seen, the value of the gap thickness $t_{gap}$ has an unusual and unexpected dependence on the electrostatic image force generated by a charged bead residing at bead collection zone BCZ. This is due to the unusual dependence of the gap thickness $t_{gap}$ on the bead overall size $r_{bead}$, and the size of the bead collection zone, $R_{zone}$, as given above.

The result is that the recessed bead collection zone BCZ allows that only beads which will physically fit there without being pushed out of the bead collection zone by interference with the shield material 10 will experience a non-diminished electrostatic image force. One can see the electrostatic image force drop drastically as the bead size increases. As shown in the plot, using the example given above, starting with bead sizes for which $t_{gap}$ is zero, a ninety percent reduction in the electrostatic image force occurs for a nine percent increase in bead overall diameter. The thinner the thickness $t_D$ of dielectric layer D, the greater the enhancement of this effect.

Those of ordinary skill will recognize that the above calculations provide guiding principles, but are based on underlying assumptions which in practice can be applicable to varying degrees. Thus, empirical results will be influenced by factors such as the degree to which beads vary from spherical shape, the degree to which the beads can deform, the solvent content of the beads, and the like.

Available bead compositions are well known in the arr, and are typically polymer-based, such as divinylbenzene copolymer, polystyrene; polyethylene glycol; or polyethylene glycol graft polystyrene, such as supplied under the trade name PEG-PS by PerSeptive Biosystems of Framingham, Mass.; or cross-linked polyethylene glycol resin, as supplied by Rapp Polymer GmbH of Germany. Beads can be dry, or can have adsorbed a solvent such as an aqueous solution, or a fine powder. Beads can also be, for example, dry paint or phosphor particles, or any other powders that can be triboelectrically charged.

Beads can be charged prior to their application to the bead manipulating chuck, for example, using plasma charging, or by the use of tribocharging (rubbing or contact charging), or other charging methods, as known in the art. Materials that can be used for tribocharging include polytetrafluoroethylene (TEFLON®), and polymers of chlorotrifluorethylene, chlorinated propylene, vinyl chloride, chlorinated ether, 4-chlorostyrene, 4-chloro4-methoxy-styrene, sulfone, epichlorhydrin, styrene, ethylene, carbonate, ethylene vinyl acetate, methyl methacrylate, vinyl acetate, vinyl butyral, 2-vinyl pyridine styrene, nylon and ethylene oxide. See, for example, "Triboelectrification of Polymers" in K. C. Frisch and A. Patsis, *Electrical Properties of Polymers* (Technonmic Publications, Westport, Conn.), which is hereby incorporated by reference in its entirety. Also see *Handbook of Electrostatic Processes*, Jen-shih Chang, Arnold J. Kelly, and Joseph M. Crowley, eds., Marcel Dekker, Inc., New York, ©1995. For example, polytetrafluoroethylene and polyethylene and other materials that become negatively charged tend to create a positive charge on the beads. Nylon and other materials that become positively charged will tend to create a negative charge on the beads. When using mechanical shaking to tribocharge beads, it is preferred that the ratio of the amount or mass of tribocharging material used to charge the beads to the amount or mass of beads is such that the respective total surface areas of the tribocharging material and the beads are about equal.

Figure 6:
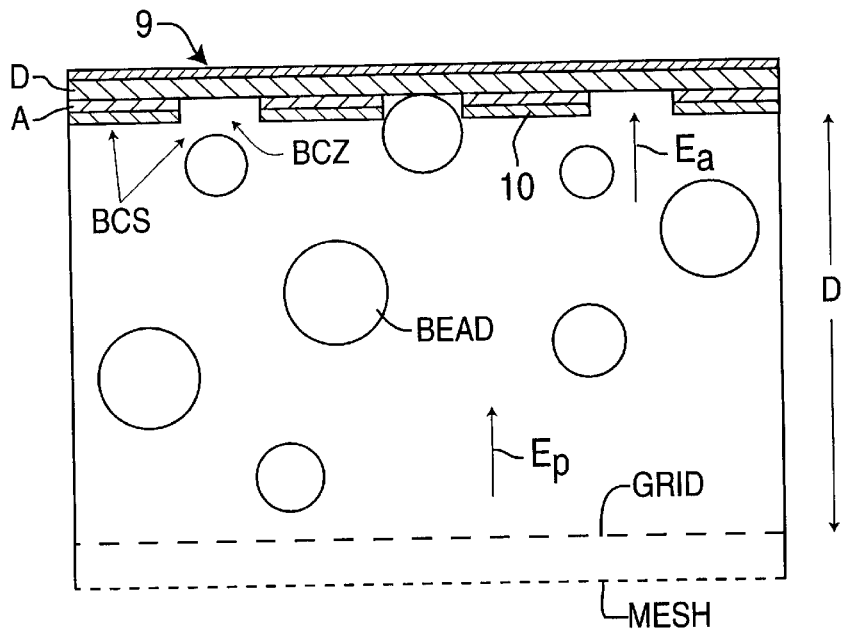
FIG. 6 shows a cross-sectional view of part of a bead manipulating chuck structurally similar to that shown in FIGS. 1, 2, 3, and 4, showing structures that form three bead collection zones, and including a bead dispenser mesh and grid.

Now referring to FIG. 6, a cross-sectional view of part of a bead manipulating chuck structurally similar to that shown in FIGS. 1, 2, 3, and 4, is given, showing structures that form three bead collection zones, and including a bead dispenser mesh and grid, shown symbolically. At the lower end of this figure is a bead dispenser grid (GRID) shown at a distance D from the bead contact surface BCS. Just under the bead dispenser grid is bead dispenser mesh (MESH). In this example, charged beads must pass through the bead dispenser mesh and grid prior to contacting the bead manipulating chuck However, beads can be introduced into the space between the bead dispenser mesh and grid, or in the space between the grid and the bead manipulating chuck. When conductive, the grid and mesh can also serve as driving electrodes to electrically propel charged beads toward the bead contact surface of the bead manipulating chuck. Any number of mesh types can be used, such as a #270 mesh (Newark Wire Cloth Co. Newark N.J.) for particles about 4–6 microns diameter; or a #200 mesh for particles of greater than about 6 microns diameter. The bead manipulating chuck structure shown is as above, with bead electrode 9 influencing the three bead collection zones shown. The grid can, for example, be a coarse grid having 2 mm diameter holes.

Various size beads are shown for illustration. For attracting and retaining negatively charged beads, for example, one can apply a negative bias to the bead dispenser mesh and/or grid, and a positive bias to the bead electrode 9, while a grounded shield material 10 (which enhances user safety at the bead contact surface) or a negatively biased shield material 10 helps guide beads to their intended destinations at the bead collection zones BCZ. Electric attraction field $E_a$ as shown reflects any attractive potential applied to bead electrode 9.

Generally, there is a discrimination field due to any applied voltage $V_p$ applied between the bead dispenser grid and the bead manipulating chuck, generally at the bead electrode 9. As an example of bead manipulating chuck operation, bead electrode 9 can be biased at +2000 volts, the bead dispenser grid at –2533 volts, and the bead dispenser mesh at –3800 volts, and the shield material 10 grounded (set to 0 volts), for manipulating negatively charged beads. This gives an applied voltage $V_p$ of 4533 volts total across distance D, and a discrimination field roughly equal to $V_p/D$. This will function in sorting out beads according to polarity and charge/mass ratio, with beads of a certain charge/mass ratio and correct polarity being encouraged to seat themselves at the bead collection zones. The bead dispenser mesh can be located at a distance of ⅜" (9.5 mmn) under the bead dispenser grid. Acoustic stimulation or other means can be used to propel beads through the bead dispenser mesh toward the grid and bead manipulating chuck. Such a propelling mechanism can be helpful, since image forces can cause charged beads to adhere to conductors. The grid functions to strongly discourage positively charged beads from entering the space between the bead dispenser grid and the bead manipulating chuck, for even if a positively charged bead emerges above the bead dispenser mesh due to its own high velocity, the field gradient between the mesh and the grid will further discourage its passage through the grid. For the purpose of so discouraging transit of beads of an inappropriate charge, the electric field between the bead dispenser mesh and grid can be made greater than that between the dispenser grid and the bead manipulating chuck. The relative field values of interest vary with the distance D selected, and with the voltages applied to the mesh, grid and bead electrode 9. Such a differential in electric field values is useful when acoustic or other means are used to propel beads towards the chuck.

There is also electric polarization in the beads moving about the space between the bead dispenser grid and the bead manipulating chuck, giving rise to a polarization field. We can sum this field and the discrimination field, and refer to them simply as the polarization and discrimination field, $E_p$; a sample rough field line is shown, labeled, "$E_p$."

The polarization and discrimination field, $E_p$, is mostly determined by the applied voltage $V_p$ between the bead dispenser grid and the bead manipulating chuck across an overall distance D shown in FIG. 6, $$E_p \approx V_p/D. \tag{10}$$

$E_p$ is generally—but does not have to be—set to be less than that required to lift the beads in the absence of an attraction field from any of the bead electrodes: [Steve, please confirm]

$$E_p \geq g/(q/m). \tag{11}$$

The field $E_p$ across a the distance D shown is gradual; as mentioned above, the electrostatic image force dominates in the vicinity of the bead collection zone BCZ. Of course, the shield material 10 can also generate an image charge in response to a charged bead in the vicinity, but it is believed that the mobility of this image force allows the beads to move (e.g., roll) to the bead collection zones. Empirical results indicate that the charge on beads is not rapidly dissipated through contact with conductive shield material.

Using the bead manipulating chuck configuration as given in FIG. 6, and using the above potentials applied to bead electrode 9, shield material 10, the bead dispenser grid and mesh, the critical dependence of the electrostatic image force on the overall bead diameter can be experimentally verified. One can use a 16 pixel chuck such as shown in FIG. 2 having a bead collection zone BCZ of diameter $D_{zone}$ equal to 225 microns; a thickness $t_D$ of the dielectric layer D of 25.4 microns, with the dielectric layer having a simple isotropic dielectric constant $\epsilon$ of 2.0; a thickness $t_1$ of the shield material 10 of 35 microns; and a thickness $t_2$ of the adhesive layer A of 25.4 microns, giving a total recession of the bead collection zone, $T_{recession}$, of 60.4 microns; a grid, as shown, with 2 nmm diameter openings; a #270 fmeness mesh, as shown, and at a distance of ⅜" (9.5 mm) below the grid. A bead distribution is introduced into the bead dispenser, consisting of about 12 mg of 250–300 micron diameter polystyrene beads; about 57 mg of 170–220 micron diameter Merrifield beads, about 520 mg of 300–350 micron diameter polystyrene beads.

Using these values in the model given above for the electrostatic image force generated as a function of the gap width $t_{gap}$, the electrostatic image force $F_{image}$ drops from 100 percent to 25 percent as the bead overall diameter goes from 269.9 microns to 309.9 microns. The model therefore indicates that the Merrifield beads, with diameters in the 170–220 micron range, should be picked up and retained by the bead manipulating chuck, while most of the 300–350 micron diameter polystyrene beads will not, even though they are far more plentiful in the mixture. Four trials are undertaken, with deposition times of 5 seconds. During all four trials, none of the 300–350 micron polystyrene beads are captured by the chuck; one 250–300 micron diameter polystyrene bead is captured; and all other beads captured are the Merrifield beads having the 170–220 micron diameters.

It should be noted that with the electrostatic bead manipulating chuck operating in this way, it is essentially analogous to an electrical low pass filter—allowing attraction, retention, and later discharge of beads that have overall diameters below the critical or maximum value for which $t_{gap}$ above is zero.

Overall, bead manipulating chucks according to this invention use field guidance so that only around a bead collection zone and bead electrode 9 will the electric fields be strong enough to raise a bead from the bead dispenser or bead dispenser mesh and subsequently guide it toward the bead collection zone and optionally, bead hole 69. Once a bead lands there, it weakens and shields the electric field in the vicinity and no other beads are encouraged to arrive there.

In the course of using the bead manipulating chucks of this invention, a number of operating modes can be used. For bead pickup or retention, a bead electrode, either exposed or unexposed to the bead contact surface, is electrically biased to attract beads, while the mesh of the bead dispenser or other conductive surface can be biased with the opposite polarity. Any number of bead electrodes 9 can be used, and they can be individually and separately connected by known means to facilitate individual and selective addressing in two dimensions.

During bead pickup, the shield material 10 of the embodiments described in FIGS. 1–4 can be held at ground potential, or it can be biased to a charge polarity similar to that of the desired beads. The shield material 10 then becomes a repulsive field conductor.

However, even when grounded and not acting in an explicitly repulsive manner, shield materials are useful, helping to define and shape the attraction field $E_a$ set up by the bead electrodes, particularly because the attraction field would otherwise be shaped instead by any dielectric material used surrounding the bead electrode, such as dielectric layer D. Shield material 10 can be allowed to "float," not biased or grounded. Generally however, grounded or not, good results are obtained when the shield materials are grounded, or when biased at a voltage between that applied to the bead electrode(s) 9 and that applied to the bead dispenser mesh (MESH).

Once attracted and retained, beads on the bead manipulating chuck are optionally transported to a substrate, microtiter plate, processing equipment or other destination by moving the entire bead manipulating chuck, or alternatively, the target substrates or plates or processing equipment are brought to the chuck. Beads can then be released or discharged in a controlled manner when any or all of the applied voltages, such as those given above, are reversed or set to zero. For example, for bead release, the bead electrode 9 can be shorted out or grounded (0 volts), or have an opposite voltage applied. Optionally, when shield material 10 is used, it can be biased to be repulsive to beads during bead discharge. An acoustic releasing mechanism or process can be used to aid in bead discharge and placement.

When using bead manipulating chucks according to the present invention, the temperature is preferably between about −50° C. and about 200° C., and more preferably between about 22° C. and about 60° C. Relative humidity can be 0–100 percent, so long as condensation does not occur; more preferably the relative humidity is about 30 percent.

There can be multiple bead collection zones for each independently controlled bead electrode 9. The dielectric layers used can increase safety, and electrical isolation between electrodes and conductors. The dielectric layers also reduce fields produced by applied voltages and allow retention of beads containing a higher net charge. In addition, the dielectric layers also provide structural rigidity and strength to the bead manipulating chuck.

Bead electrodes 9 can comprise any number of separately addressable pixels or elements in two directions x and y, each having separately controlled bead collection zones. Any number of well known means and structures are used to facilitate addressing as is known in the electrical and electronic arts. In this way, combinatorial synthesis or analysis can be simplified as discussed above. In using the bead manipulating chucks, one can expose the bead contact surface of such a chuck to beads; selectively apply voltages, such as the voltages given above, for each x-y addressable well, pixel, or individual spatial element of the chuck, to attract and retain beads selectively at each bead collection zone; then release the beads onto a desired destination aligned with the bead manipulating chuck by selectively reversing or reducing voltages associated with each bead collection zone as required.

It is also possible that beads attracted by the chuck can become substrates for known processes, such as, for example, coating processes including processes that apply pharmaceutically active compounds. In one preferred aspect, such processed beads are large diameter beads of large overall size, say about 3 mm in diameter. Processed beads include oblong shapes, made of water soluble film, such as hydroxypropyl methyl cellulose resin. See U.S. patent application Ser. No. 08/471,889, "Methods and Apparatus for Electronically Depositing a Medicament Powder Upon Predefined Regions of a Substrate." filed Jun. 6, 1995 now U.S. Pat. No. 5,714,007, and continuation-in-part thereof filed Jun. 6, 1996, Ser. No. 08/659,501, which documents are incorporated herein by reference in their entirety.

Electrostatic chucks can be scaled up for large scale continuous manufacturing, such as using a sheet of an edible substrate for use with tablets, for example, or a sheet of an inhaler substrate. For example, hydroxypropyl methyl cellulose can be used as substrate, such as Edisol M Film M-900 or EM 1100 available from Polymer Films Inc. (Rockville Conn.). Using an exposed bead electrode 9 the chuck can maintain the charge of a pharmaceutical substrate that would otherwise lose its charge. Generally, sizing of bead diameters can range from less than about one micron to about 1000 microns or larger, about 150 microns is fairly typical.

With bead size selection now governed by physical design and geometries of the bead manipulating chuck, beads can through use of the chuck be sorted into groups or lots, which can be of tighter width or diameter tolerances than are possible through conventional sieving. This allows meeting, for example, a minimum 5 percent content uniformity, which degree of uniformity can be important for dosage form approvals.

Specifically, multiple bead manipulating chucks, each having progressively smaller diameter bead collection zones ($D_{zone}$), can be used serially to eliminate all beads above a certain diameter value. For example, a first bead manipulating chuck can be used to capture only beads above roughly 280 microns diameter, these retained beads in turn can be discharged and delivered to a second bead manipulating chuck whose geometries allow capture of only beads below roughly 260 microns; upon discharge, these beads in turn can delivered to a chuck set up to capture only beads below 240 microns, etc. Then optionally, the resulting beads from such a group or lot narrowing process can be delivered to a bead manipulating chuck for elimination of all beads below a certain diameter. For example, the resulting beads can be delivered to a bead manipulating chuck that favors beads of 180 microns and smaller. Beads then captured can then be discarded, so as to create a class of beads between 180 and 240 microns. The process can be refined so that beads in the 220 micron range and smaller can be discarded; at that point, the remaining beads should be in the 220–240 micron range.

By this kind of serial capture and release of desired beads with successively smaller preferred bead diameters, followed by a winnowing of beads smaller than desired by using bead manipulating chucks to discard small beads, lots or groups of beads having narrow size ranges of a few percent can be realized. Using the invention, one can practice size selection using just using two bead manipulating chucks—one to select beads of a size under, say by way of example 220 microns—and another to discard resulting beads whose size is under, say, 210 microns.

Bead manipulating chucks of this invention can be fabricated, for example, using flexible circuit board manufacturing technology, giving a bead collection zone diameter $D_{zone}$ having manufacturing tolerances of, for example, 10 microns or better. In an alternative example, using well known semiconductor processing fabrication techniques, bead collection zone diameter ($D_{zone}$) tolerances of 1 micron or less are achieved.

To further decrease the net variation in bead widths in a group of beads, and to insure in turn that net overall variation in bead surface areas and volumes are narrower, the number of beads used in making a single capsule or tablet, or in filling a single array in a micro-titer plate, for example, can be increased. By using a large sample of beads to make a human drug administration form, the standard deviation of bead overall width from the mean, $D_{average}$, through the use of bead manipulating chucks, will drop as the square root of the sample size. Using single beads to make tablets, for example, where the beads have a standard deviation in overall width or size of 5 percent, gives a standard deviation in bead volume of about 16 percent. If, however, 10,000 beads are used to make each tablet, this standard deviation is lowered by a factor of 100, to 0.16 percent, which is outstanding by present drug preparation standards.

Figure 7:
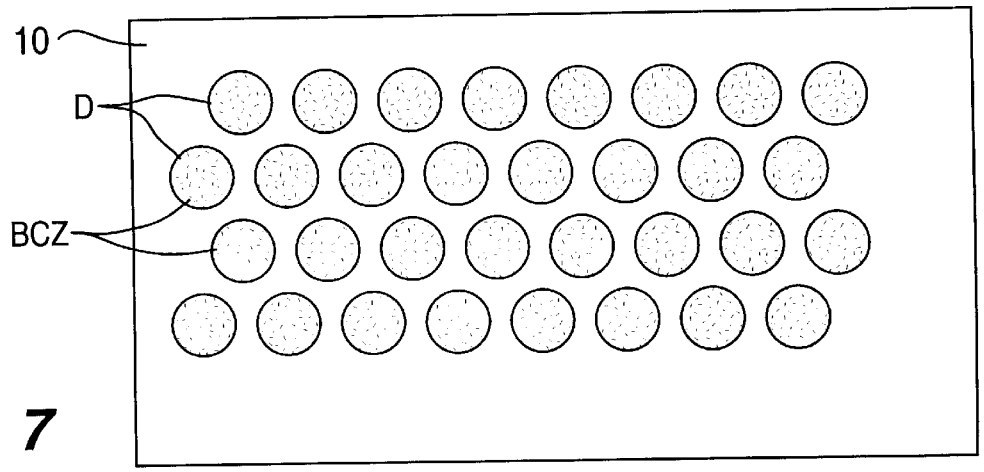
FIG. 7 illustrates hexagonal close packing of bead collection zones

The locations of all pixels or bead collection zones BCZ on the bead contact surface are ideally arranged in a "hexagonal close pack" structure, as illustrated in FIG. 7, which shows shield material 10 and dielectric layer D for an embodiment of the invention. This configuration gives the highest density of beads per unit area of the bead contact surface to allow as many beads as possible to be manipulated at a time. Specifically, the center-to-center distance of the bead collection zones BCZs on the bead contact surface is preferably about 1.5 times the diameter of the mean bead diameter. This packing further enhances selectivity of the bead manipulating chuck at the high end of the distribution of bead diameters to be attracted and retained. The exact center-to-center bead packing ratio is best determined experimentally. For example, a 5 cm×5 cm size bead manipulating chuck can selectively pick up and discriminate among available bead diameters of beads contacting or approaching the bead contact surface, with a capacity for about 32,000 bead collection zones that can attract, retain and later discharge beads of 200 micron average overall diameters.

Obviously, many modifications and variations of the present invention are possible in light of the above teaching. It is therefore to be understood, that within the scope of the appended claims, the invention can be practiced otherwise than as specifically described or suggested here.

What is claimed:

1. A bead manipulating chuck for attracting first bead(s) of radius which is approximately a selected radius or less to a bead collection zone on a bead contact surface, and for selectively retaining and discharging said first beads from the bead collection zone, comprising:

a bead electrode for establishing a bead attracting field to said bead collection zone, said bead electrode shaped and configured so that when an appropriate potential is applied thereto, said first bead(s) are influenced by it and guided to retention by said bead electrode to said bead collection zone;

said bead collection zone recessed from said bead contact surface, and configured and positioned with respect to said bead contact surface such that the resultant electrostatic image force generated between said first bead and said bead electrode for a given bead charge is higher than that for second beads of higher than the selected diameter.

2. The bead manipulating chuck of claim 1, wherein said bead manipulating chuck is for attracting charged beads of a selected amount of charge of a given polarity, and wherein recess and bead electrode are configured and sized so that beads of more than about the selected size do not induce a retention-sufficient image force.

3. The bead manipulating chuck of claim 1, wherein said bead contact surface comprises a shield material on said bead contact surface; said shield material shaped and configured to allow beads to be influenced by said bead electrode and to allow said bead collection zone to be recessed on the bead contact surface.

4. The bead manipulating chuck of claim 1, further comprising a dielectric positioned between said bead electrode and said bead contact surface.

5. The bead manipulating chuck of claim 1, further comprising:

a dielectric positioned between said bead electrode and said bead contact surface; and a shield material on said bead contact surface; said shield material shaped and configured to allow beads to be influenced by said bead electrode and to allow said bead collection zone to be recessed on the bead contact surface.

6. The bead manipulating chuck of claim 1, wherein said bead manipulating chuck comprises a connecting bus for said bead electrode.

7. The bead manipulating chuck of claim 6, wherein said bead manipulating chuck comprises two bead electrodes connected to said bus electrode; each said bead electrode spaced apart, sized and located in proximity to a separate bead collection zone recessed from said bead contact surface in such a manner so as to guide said beads to retention at said bead collection zones.

8. The bead manipulating chuck of claim 7, wherein said bus electrode is configured to allow x-y addressing of said bead electrodes to control individually and selectively said bead collection zones.

9. A method for transporting beads using a bead manipulating chuck, comprising:

applying a first potential to one or more bead electrodes of the bead manipulating chuck of claim 1 to create bead attracting fields; and attracting and retaining one or more beads, each to separate said bead collection zones.

10. The method of claim 9, additionally comprising:

reducing said first potential applied to said bead electrodes, thereby reducing said bead attracting fields sufficiently so as to release any bead that does not induce a retention-sufficient image force.

11. The method of claim 10, further comprising:

a size selective process comprising two or more iterations of steps through.

12. The method of claim 11, additionally comprising:

reducing said first potential applied to said bead electrodes sufficiently to discharge a beads from said bead collection zones to desired locations.

13. The method of claim 12, additionally comprising:

aligning the bead collecting zones of the bead manipulating chuck with the locations where beads are to be released prior to step.

14. The method of claim 9, additionally comprising:

using a bead contact surface that comprises a shield material; said shield material shaped and configured to allow beads to be influenced by said bead electrode and to allow said bead collection zone to be recessed.

15. The method of claim 14, additionally comprising:

wherein the shield material is an electrode, grounding the shield material.

* * * * *